United States Patent [19]

Ozols

[11] Patent Number: 4,852,499
[45] Date of Patent: Aug. 1, 1989

[54] ADJUSTABLE FOLDING TABLE FOR VEHICLES

[76] Inventor: Ilmars Ozols, 11 Killarney Gardens, Pointe Claire, Quebec, Canada, H9S 4X7

[21] Appl. No.: 180,224

[22] Filed: Apr. 11, 1988

[51] Int. Cl.$^4$ .............................................. A47B 23/00
[52] U.S. Cl. ........................................ 108/44; 108/25; 108/112
[58] Field of Search .............. 108/44, 45, 46, 25, 108/90, 97, 112, 99, 95; 297/161, 162, 108, 174; 248/282, 283; 224/273, 42.43, 42.44, 42.45 R

[56] References Cited

U.S. PATENT DOCUMENTS

| | | | |
|---|---|---|---|
| 984,184 | 2/1911 | Beecroft | 248/282 |
| 2,597,330 | 5/1952 | Huddleston | 108/45 |
| 2,657,107 | 10/1953 | Bisaga et al. | 108/45 |
| 2,772,934 | 12/1956 | Eraut | 108/45 |
| 4,359,004 | 11/1982 | Chappell | 108/44 |
| 4,619,386 | 10/1986 | Richardson | 108/44 X |
| 4,645,167 | 2/1987 | Hardwick | 297/188 X |
| 4,672,898 | 6/1987 | Davidson | 108/44 X |

Primary Examiner—Kenneth J. Dorner
Assistant Examiner—José V. Chen
Attorney, Agent, or Firm—Roy A. Ekstrand

[57] ABSTRACT

An adjustable folding table for vehicles includes a pair of generally planar table halves pivotally secured to a cylindrical L-shaped support member. Lock means are provided for detenting or locking the table halves in an extended position and a pair of beverage holders suitable for receiving beverage containers or the like are pivotally secured to the undersides of the table halves. A second L-shaped support member is pivotally secured to the first L-shaped support member and is itself pivotally attached by a bracket to a convenient surface within the vehicle interior. The two L-shaped support members and their pivotal attachments cooperate to provide for multipositioning of the table within the vehicle interior. The table is configurable to a folded or closed position and may be pivoted to a storage position within the vehicle interior.

14 Claims, 2 Drawing Sheets

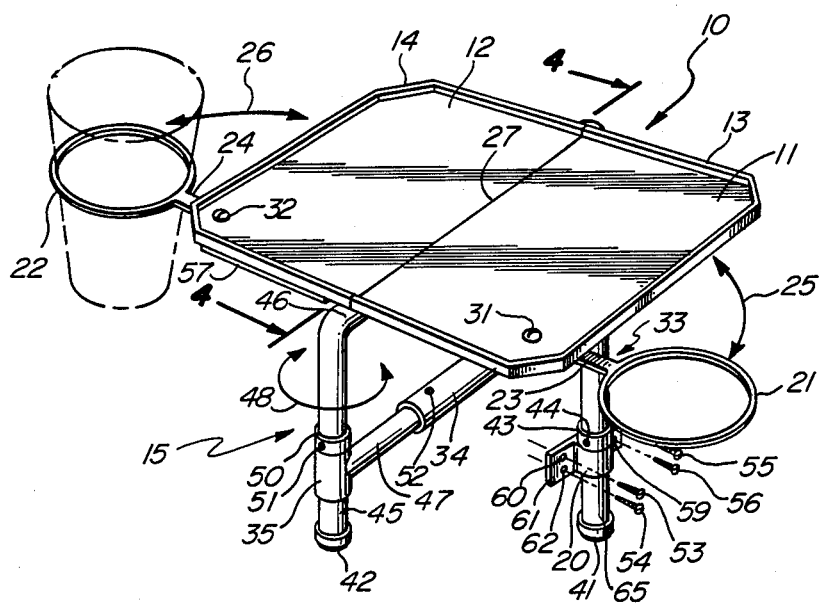
FIG. 1
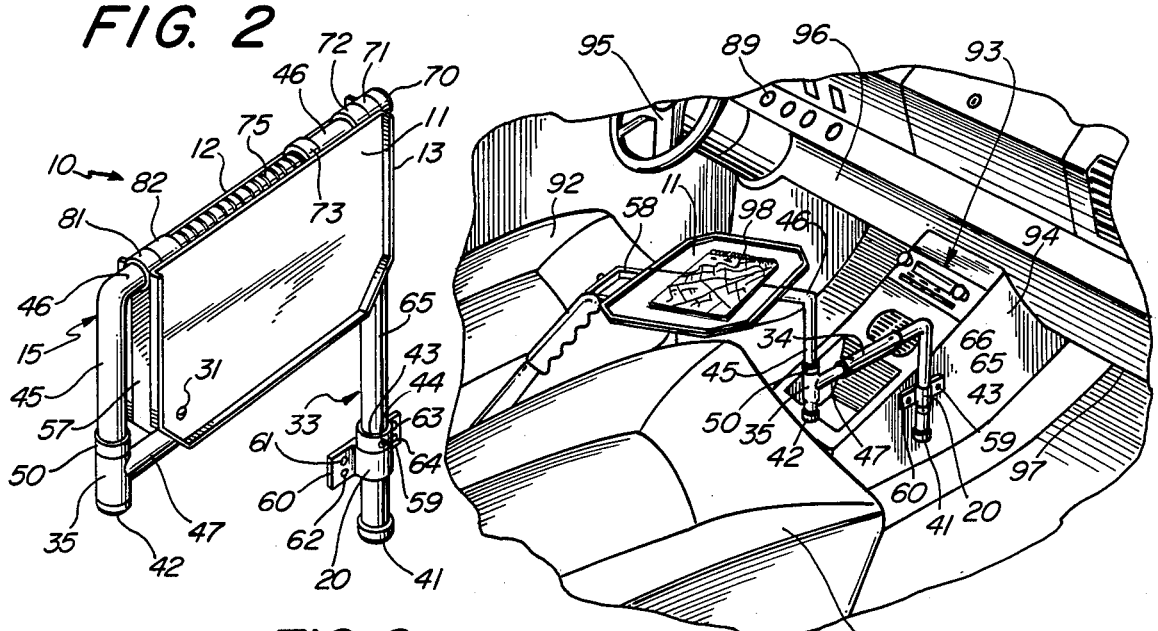
FIG. 2
FIG. 3
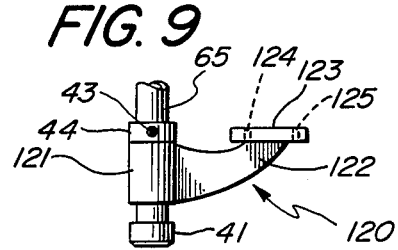
FIG. 9

ADJUSTABLE FOLDING TABLE FOR VEHICLES

SPECIFICATION

1. Field of the Invention

This invention relates generally to vehicles such as automobiles, trucks, and the like and particularly to adjustable tables for use therein.

2. Background of the Invention

The operators and passengers of various types of vehicles such as automobiles, trucks, and the like frequently sit for extended periods of time within the vehicles. During such extended periods of time, there often arises a need to have a platform or table available for use within the vehicle interior for purposes of supporting food or beverages, or the like, or for providing a convenient note-taking or map reading surface. In recent years, a great number of drive-in and drive-thru restaurants have come into existence in which food is provided or served which is clearly intended to be consumed by the occupants of the automobile or truck. Often, the driver of the vehicle is the sole occupant and the object of obtaining food or the like from a drive-in or drive-thru type restaurant is to provide food which the driver will consume while continuing his or her journey. In such case, an even greater need arises for a convenient support or table platform accessible to the driver which facilitates eating while driving.

Because of the many and varied configurations and dimensions of automobile and truck interiors, a problem arises in providing a suitable support platform or table for use in automobiles and trucks. To meet this need, practitioners in the art have provided various adjustable tables and adjustable support structures intended to accommodate the wide variety of dimensions and configurations within vehicles such as automobiles or trucks.

U.S. Pat. No. 4,359,004 issued to Chappell sets forth CAR SEAT TABLES in which a foldable table structure is supported by a vertical column which in turn is supported by a platform having means for resting upon the floor or transmission hump of the vehicle floor. Weighted members are secured to the support to provide balance for the table. The position of the table is adjustable in the vertical plane and is pivotally secured to the vertical support.

U.S. Pat. No. 4,086,859 issued to Dondero sets forth a BOAT TABLE which provides a planar table member secured to a vertically oriented offset support member. The vertical support is secured to a convenient vertical surface by a bracket and clamping arrangement. Clamp means on the bracket permit the vertical support to be raised vertically and pivoted about the support to move the table in the horizontal plane.

U.S. Pat. No. 3,391,960 issued to Megargle, et al. sets forth a MOTOR VEHICLE INTERIOR in which a foldable table platform is pivotally secured to a vertical support member. A base plate is secured to the floor portion of the vehicle and receives the vertical support member. An intermediate clamp in the vertical support member permits the pivoting of the table in the horizontal plane and the adjustment of table height in the vertical plane. The table comprises two half portions hingeably secured to the support member by locking support means which permit the half members to be folded downwardly for storage.

U.S. Pat. No. 3,048,457 issued to Haase sets forth an AUTOMOBILE TRAY DEVICE in which a tray device is secured to the center hump of the interior of an automobile by an adjustable bracket which rigidly supports the tray device beneath the vehicle front seats. Means are provided for adjusting the vertical heighth of the tray device and its lateral position within the vehicle interior. The device includes a flat interior portion and raised side walls providing a convenience receptacle for loose material within the vehicle interior.

U.S. Pat. No. 4,672,898 issued to Davidson sets forth a MULTI-LOCATION ADJUSTABLE TABLE having a generally planar table member and a vertical support secured to the table member. A bracket configured to be secured to a convenient vertical surface receives one end of the vertical support in a pivotal attachment. The vertical support includes a right angle offset which offsets the position of the table from the bracket support. Detent means are operative in the coupling of the vertical support to the support bracket to provide a plurality of incremented positions for rotation of the vertical support and movement of the table in the horizontal plane.

While the foregoing described prior art devices have to some extent been successful in meeting the above-described needs of vehicle passengers and drivers, they generally have not provided the degree of adjustment and accomodation necessary to meet the wide variety of vehicle interior configurations and sizes. In addition, such devices have been found to be difficult to store during periods of non-use.

Accordingly, there remains a need in the art for an adjustable table suitable for use in a wide variety of vehicle interiors and capable of easy use and storage by both passengers and drivers within vehicles.

SUMMARY OF THE INVENTION

Accordingly, it is a general object of the present invention to provide an improved adjustable folding table for vehicles. It is a more particular object of the present invention to provide an improved adjustable folding table for vehicles which includes a plurality of articulated support arms for supporting the table in a wide variety of table positions. It is a still more particular object of the present invention to provide an improved adjustable folding table for vehicles which permits the convenient storage of the table when not in use.

In accordance with the present invention, there is provided an adjustable folding table for vehicles having a table portion comprising two table halves hingeably secured to a support member, a multiply articulated support member having means for vertical heighth and rotational supporting the table portion in a plurality of positions, and bracket means for securing the support means to a convenient surface of the vehicle interior. The table halves are foldable between an extended position forming a single planar member and a storage position.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIG. 1 is a perspective view of the present invention adjustable folding table for vehicles in the open position;

FIG. 2 is a perspective view of the present invention adjustable folding table for vehicles in the storage position;

FIG. 3 is a perspective view of a portion of a typical vehicle interior having the present invention adjustable folding table for vehicles supported therein;

FIG. 9 is a side elevation view of a portion of an alternate embodiment of the present invention adjustable folding table for vehicles.

DESCRIPTION OF THE PREFERRED EMBODIMENTS

Figure 4:
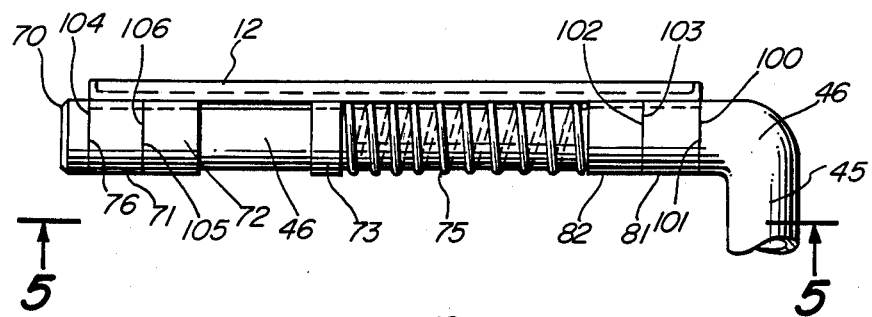
FIG. 4 is a section view of a portion of the present invention adjustable folding table for vehicles taken along section lines 4—4 in FIG. 1.

FIG. 1 sets forth a perspective view of the present invention adjustable folding table for vehicles generally referenced by numeral 10. A pair of generally planar table halves 11 and 12 are joined at a seam 27. Table half 11 defines an upwardly extending lip 13 while table half 12 defines a similar upwardly extending lip 14. A beverage holder 21 is coupled to table half 11 and pivotally secured thereto by a fastener 31. Similarly, a beverage holder 22 is supported by an arm 24 and is pivotally secured to table half 12 by a fastener 32. A support member 40 includes a pair of generally cylindrical arms 45 and 46 joined in a right angled configuration. By means set forth below in greater detail, arm 46 supports table halves 11 and 12 and is received within T-member 35. An end cap 42 is secured to the lower portion of arm 45. A generally cylindrical lock ring 50 encircles arm 45 above T-member 35 and is secured by a fastener 51. An arm 47 extends outwardly from T-member 35 in a right angle relationship to arm 45. A generally cylindrical sleeve 34 receives one end of arm 47 and is secured thereto by a fastener 52. A L-shaped support member 33 includes a generally cylindrical arm 65 and a generally cylindrical arm 66 joined in a right angle relationship (the latter seen in FIG. 7). As is also better seen in FIG. 7, arm 66 of support member 33 is received within sleeve 34 and secured thereto by a fastener 70. A generally cylindrical bracket 20 defines an interior passage (not seen) which receives arm 65 of support member 33. Arm 65 further supports an end cap 41. Bracket 20 further includes a pair of outwardly extending generally planar mounting flanges 59 and 60. Flange 59 defines a pair of apertures 63 and 64 while flange 60 defines a pair of apertures 61 and 62. A plurality of fasteners 53 through 56 inclusive are received within apertures 61 through 64 respectively and secure bracket 20 to a convenient vertical surface within the vehicle structure (see FIG. 3). A lock ring 43 having a generally cylincrical configuration encircles arm 65 above bracket 20 and is secured thereto by a fastener 44.

In the position shown, table 10 is in its open configuration in which table halves 11 and 12 are moved to an extended coplanar relationship in which they abut at seam 27. When so configured, table halves 11 and 12 form a continuous planar surface therebetween surrounded by raised lips 13 and 14 which also meet at seam 27. In addition, beverage holders 21 and 22 are shown pivoted outwardly in the directions indicated by arrows 25 and 26 respectively and occupy their extended positions. As can be seen and as is described below in greater detail, beverage holders 21 and 22 are pivotally supported by fasteners 31 and 32 respectively and are pivotable thereabout in the directions indicated by arrows 25 and 26 respectively between the open position shown and a retracted position in which beverage holders 21 and 22 are supported beneath table halves 11 and 12 respectively.

Figure 7:
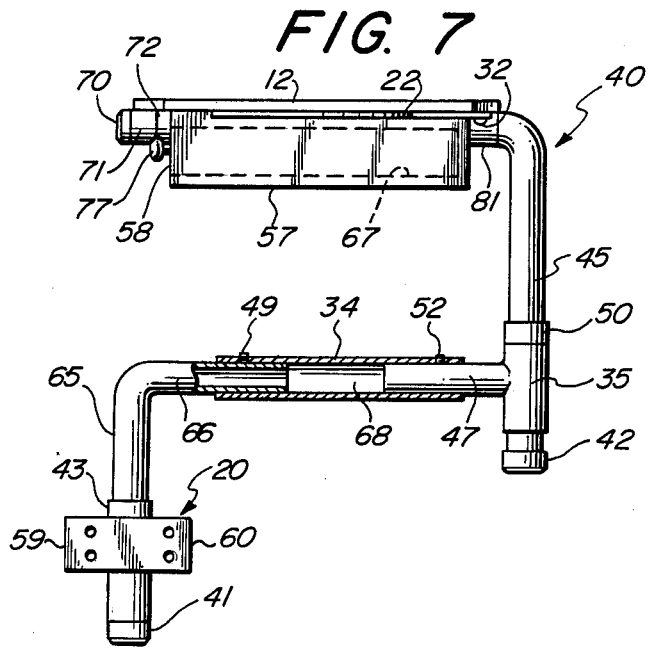
FIG. 7 is a partially sectioned side elevation view of the present invention adjustable folding table for vehicles.

In addition, the rotational position of table halves 11 and 12 may be altered by simply rotating table halves 11 and 12 such that support member 40 is rotated within T-member 35 in the manner indicated by arrow 48. It should be noted that lock ring 50 is secured to arm 45 by a fastener 51. Thus, lock ring 50 abuts and rides upon the upper portion of T-member 35 to secure arm 45's vertical position within T-member 35. Accordingly, the vertical position of support member 40 with respect to the remainder of table 10 may be adjusted by changing the position of lock ring 50 upon arm 45. In any event, table halves 11 and 12 are rotatable from the position shown to an extended position such as that shown in FIG. 3 for the convenience of the vehicle occupants. As is set forth below in greater detail, the position of arm 47 with respect to sleeve 34 may be adjusted by loosening fastener 52 and moving arm 47 with respect to sleeve 34 and tightening fastener 52 at the appropriate position. A similar adjustment set forth below in greater detail in connection with FIG. 7 is obtained by adjusting the position of arm 66 within sleeve 34 and thereafter tightening fastener 70 upon arm 66. The adjustments of arms 47 and 66 within sleeve 34 permits the extension of table 10 to be adjusted to suit the configuration and size of the vehicle interior.

Further adjustment of the position of table halves 11 and 12 is obtained by adjusting the position of arm 65 within bracket 20. As set forth above, the position of arm 65 within bracket 20 is controlled by the position of lock ring 43 upon arm 65. Accordingly, the upward extension of table 10 may be further adjusted by moving lock ring 43 upon arm 65 and tightening fastener 44 at the desired position. End caps 41 and 42 permit adjustment of arms 65 and 45 respectively within bracket 20 and T-member 35 respectively while precluding the complete withdrawal therefrom. Thus, the position of table halves 11 and 12 within the vehicle interior is adjustable through a plurality of motions including rotation of arm 45 within T-member 35, rotation of arm 65 within bracket 20, adjustment of the positions of lock rings 50 and 43, and the adjustment of the positions of arms 47 and 66 within sleeve 34. In its normally intended function, the positions of lock rings 43 and 50 are adjusted initially to suit the particular vehicle interior in which table 10 is utilized and thereafter remain as adjusted. Similarly, the positions of arms 47 and 66 within sleeve 34 are adjusted during the initial assembly of table 10 within the vehicle interior and are thereafter not generally distributed.

FIG. 2 sets forth a perspective view of table 10 in its storage or folded position. In the position shown, support member 40 is rotated about T-member 35 such that arm 46 is generally parallel to the combination of arms 47 and 66 and sleeve 34. In addition and in accordance with an important aspect of the present invention, table halves 11 and 12 are folded downwardly by pivotal rotation about arm 46 on either side of sleeve 34. In the closed position shown, it can be seen that arm 46 supports an end cap 70 and a plurality of generally cylindrical rings 71, 72, 73, 81 and 82, all of which are rotatable upon arm 46. In accordance with an important aspect of the present invention, rings 71 and 81 are secured to tables half 11 and are independent from table half 12. conversely, rings 72 and 82 are secured to table half 12 but are independent from table half 11. Thus, rings 71 and 81 cooperate to pivotally secure table half 11 to arm 46 while rings 72 and 82 cooperate to pivotally secure table half 12 upon arm 46. In accordance with an important aspect of the present invention described below in greater detail, a coiled spring 75 is supported upon arm 46 against ring 82 and is maintained in compression by lock ring 73. Thus, lock ring 73 is forced toward ring 82 compressing spring 75. Thereafter, lock ring 73 is secured to arm 46 by a fastener 74 (better seen in FIG. 5). By means set forth below in greater detail, spring 75, lock ring 73, and rings 81 and 82 cooperate to permit table halves 11 and 12 to be folded to the stored position shown in FIG. 2 or extended to the open position shown in FIG. 1. It should be noted that in the folded position shown in FIG. 2, table 10 may be rotated to a preferred angular position with respect to bracket 20 due to the pivotal attachment of arm 65 within bracket 20. Thus, in accordance with an important aspect of the present invention table 10 may, in the folded position shown in FIG. 2, be simply rotated out of the way to minimize its intrusion into the vehicle interior. A drawer housing 57 is secured to the underside of table half 12 and supports an extendable drawer 58 (better seen in FIG. 3). In accordance with an important aspect of the present invention, drawer housing 57 occupies the space between the undersides of table halves 11 and 12 when table 10 is in the folded position of FIG. 2. Thus, drawer housing 57 makes use of space which would otherwise be wasted in the folded configuration.

FIG. 3 sets forth the present invention adjustable folding table for vehicles supported within a typical vehicle interior 90. In accordance with conventional vehicle construction, interior 90 includes a passenger seat 91 and a drive seat 92. A dashboard 96 supports a plurality of instruments 89 and a conventional steering wheel 95. In addition, dashboard 96 defines an under surface 97, the importance of which will be set forth below in greater detail. A center console 93 is positioned between seats 91 and 92 upon the lower portion of vehicle interior 90 and is joined to dashboard 96. Center console 93 further defines a side surface 94 having a generally vertical planar construction. In accordance with the invention, table 10 comprises a bracket 20 secured to side surface 94 by flanges 59 and 60. Bracket 20 supports arms 65 and 66 which in turn are coupled to sleeve 34. Sleeve 34 supports arm 47 which in turn is coupled to T-member 35. T-member 35 supports arm 45 which in turn is joined to horizontal arm 46. Table halves 11 and 12 are folded outwardly to their open position and provide a convenient support surface for a map 98. A drawer 58 received within drawer housing 57 is slideable with respect to table half 12 and is shown in the partially open position. In accordance with an important aspect of the present invention, drawer 58 may be utilized to hold a number of convenience items such as coins, pens, pencils and the like. Drawer 58 may be closed within drawer housing 57 in the position shown in FIG. 8 by simply sliding drawer 58 inwardly to be received within drawer housing 57. As can be seen in FIG. 3 and in accordance with the abovedescribed articulation of the present invention adjustable table support, the position of table halves 11 and 12 with respect to either passenger seat 91 or driver seat 92 may be adjusted by the rotations of arm 65 within bracket 20 and arm 45 within T-member 35. In addition, the size of the vehicle interior 90 may be accommodated by adjusting arms 66 and 47 within sleeve 34 and by adjusting the positions of lock rings 45 and 50 upon arms 65 and 45 respectively. Thus, in accordance with an important aspect of the present invention, the position of table 10 may be adjusted to suit the needs of occupants seated within passenger seat 91 and/or driver seat 92. It should also be noted that the attachment of bracket 20 to side surface 94 of center console 93 preserves the interior space within vehicle interior 90. It should also be noted that table 10 may be reconfigured to the storage position shown in FIG. 2 by simply rotating table halves 11 and 12 downwardly in the manner shown in FIG. 2 and rotating the folded table halves about T-member 35 to align table halves 11 and 12 with sleeve 34. Thereafter, table 10 may be further removed from intrusion into vehicle interior 90 by rotating the folded structure about bracket 20 to align folded table halves 11 and 12 in the passenger portion of vehicle interior 90 in front of dashboard 96.

Thus, the present invention structure provides considerable flexibility and adjustability in the position of table 10 within the vehicle interior. FIGS. 4 through 9, described below, set forth details of the structure of the present invention table with particular attention to the manner in which its various members are articulated. It will be apparent, however, to those skilled in the art that equivalent structures of member articulation can be utilized without departing from the spirit and scope of the present invention.

FIG. 4 sets forth a partial section view of table 10. Arm 45 is shown partially sectioned near its junction with arm 46. Arm 46 defines an edge 101 and supports an end cap 70. End cap 70 defines an edge 76. A pair of cylindrical rings 81 and 71 are pivotable about arm 46 and secured to table half 11 (not seen). A pair of cylindrical rings 72 and 82 are pivotably supported upon arm 46 and secured to table half 12. A lock ring 73 captivates a coil ring 75 upon arm 46. As mentioned above, lock ring 73 is secured to arm 46 at a position causing spring 75 to be maintained in compression. In accordance with the invention, ring 71 defines an edge 104 abutting edge 76 of end cap 70 and an edge 105. Similarly, ring 72 defines an edge 106 abuting edge 105 of ring 71. Ring 81 defines an edge 100 abutting edge 101 of arm 46 and an edge 102. Ring 82 defines an edge 103 abutting edge 103 of ring 81. The compressive force provided by spring 75 urges ring 82 against ring 81 which in turn is forced by the compressive force of spring 75 against edge 101 of arm 46.

Figure 5:
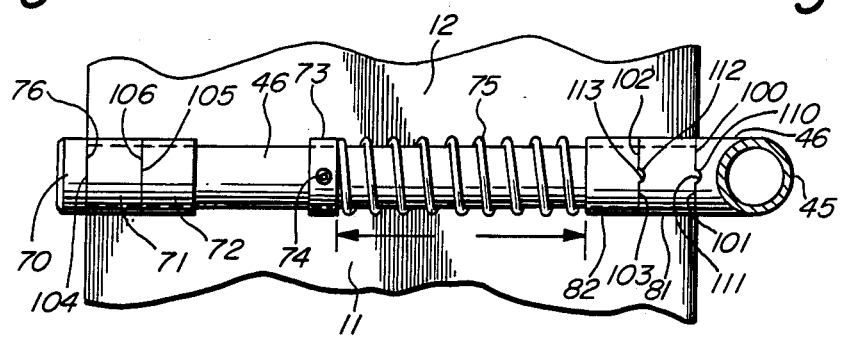
FIG. 5 is a section view of a portion of the present invention adjustable folding table for vehicles taken along section lines 5—5 in FIG. 4.

FIG. 5 sets forth a partially sectioned bottom view of table 10 taken along section lines 5—5 in FIG. 4. Accordingly, with table halves 11 and 12 extending outwardly in the manner shown in FIG. 1, arm 46 extends beneath table halves 11 and 12 and supports end cap 70, rings 71, 72, and 73, as well as rings 82 and 81 in the above-described manner. As is also described above, ring 73 secures spring 75 in compression against ring 82. A fastener 74 secures lock ring 73 to arm 46 at the appropriate position to provide the desired compressive force of spring 75. As described above, ring 81 defines edges 100 and 102 while arm 46 defines an edge 101 and ring 82 defines an edge 103. In further accordance with the present invention, edge 101 of arm 46 defines an inwardly extending notch 101. Edge 100 of ring 81 defines an outwardly extending tab 110 which in the open position shown in FIG. 5 is received within notch 101. Similarly, edge 102 of ring 81 defines an inwardly extending notch 113 while edge 103 of ring 82 defines an outwardly extending tab 112. Tab 112 is received within notch 113 when table halves 11 and 12 are opened in the position shown in FIG. 5. Thus, with tabs 110 and 112 received within notches 111 and 113 respectively, the rotational positions of table halves 11 and 12 are locked with respect to arm 46. Specifically, the cooperation of tab 110 within notch 111 secures ring 81 and thereby table half 11 with respect to arm 46. Similarly, the cooperation of tab 112 and notch 113 secures the position of table half 12 with respect to ring 81 and thereby table half 11 and arm 46. The spring force provided by spring 75 captivated between lock ring 73 and ring 72 maintains a retaining force keeping tabs 110 and 112 within notches 111 and 113. Thus, the table halves 11 and 12 are locked in the open position by the foregoing description structure.

Figure 6:
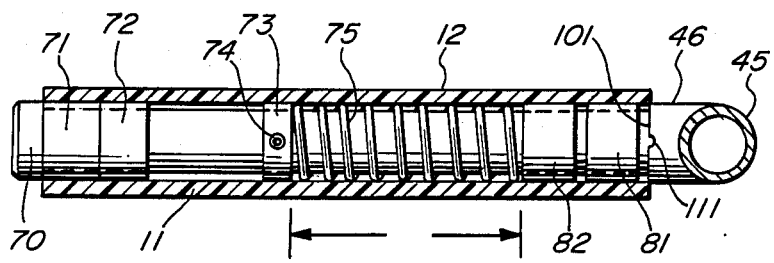
FIG. 6 is a section view of a portion of the present invention adjustable folding table for vehicles taken along section lines 6—6 in FIG. 8.
Figure 8:
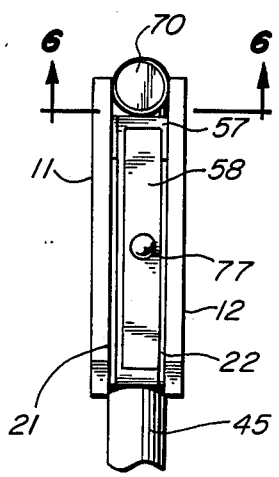
FIG. 8 is a partial view of the present invention adjustable folding table for vehicles in the closed position.

FIG. 6 sets forth a section view of table 10 in the closed position taken along section lines 6—6 in FIG. 8. With table halves 11 and 12 rotated to the closed position shown in FIG. 8, tab 110 no longer extends into notch 111. Instead, tab 110 abuts edge 101 of arm 46 which spaces ring 81 apart from edge 101 of arm 46. Similarly, the rotation of table halves 11 and 12 to the closed position shown in FIG. 6 removes tab 112 of ring 82 from notch 113 of ring 81. Tab 112 thereafter contacts edge 102 of ring 81 causing ring 82 to be spaced from ring 81. Thus, it will be apparent from examination of FIGS. 5 and 6 that the cooperation of spring 75, lock ring 73, and rings 81 and 82 provides a lock action for table halves 11 and 12 in the extended or open position. In all other positions, table halves 11 and 12 are freely rotatable about arm 46 and may assume the closed position shown in FIG. 8.

FIG. 7 sets forth a partially sectioned side elevation view of table 10. Table half 12 supports beverage holder 22 pivotally secured to table half 12 by a fastener 32. A drawer housing 57 is secured to the underside of table half 12 and receives beverage holder 22 within a slot 28. Drawer housing 57 further defines an interior drawer channel 67 which receives a generally rectangular drawer 58 in a sliding attachment. A knob 77 is secured to the forward portion of drawer 58 and facilitates its withdrawal from drawer channel 67. A L-shaped support member 40 includes a pair of generally cylindrical arms 45 and 46 joined to form a L-shaped member. Arm 46 receives a pair of rings 81 and 71 secured to table half 11 (seen in FIG. 5). A second pair of rings 72 and 82 (seen in FIG. 5) are secured to table half 12. As described above, table halves 11 and 12 are pivotally attached to arm 46 of support member 40 and are rotatable between the open position shown in FIG. 7 and the closed position seen in FIG. 8.

A T-member 35 receives arm 45 of support member 40 and is joined to a perpendicular arm 47. A lock ring 50 and an end cap 42 are secured to arm 45. A sleeve 34 defines an interior space 68 which receives arm 47. A fastener 52 is threadably supported within sleeve 34 and secures one end of sleeve 34 to arm 47. An L-shaped support member 33 comprises a pair of arms 65 and 66 joined in a right angle relationship. Arm 66 is received within space 68 of sleeve 34 and secured thereto by a fastener 70. A bracket 20, the structure of which is set forth above in FIG. 2 in greater detail, receives arm 65 and defines a pair of outwardly extending mounting flanges 59 and 60. Arm 65 supports a lock ring 43 and an end cap 41. As will be apparent from examination of FIG. 7, the extension of table 10 with respect to mounting bracket 20 is adjustable by selecting the distance arms 47 and 66 extend into sleeve 34. In the event, for example, it is desirable to reduce the offset between arms 65 and 45, fasteners 70 and 52 are loosened and arms 47 and 66 are moved inwardly within sleeve 34 a greater distance reducing space 68 within sleeve 34. Thereafter, the adjustment is maintained by tightening fasteners 52 and 70 to fix the positions of arms 47 and 66 within sleeve 34.

FIG. 8 sets forth a front view of a portion of table 10 in the folded position. As can be seen, table halves 11 and 12 are pivoted downwardly with respect to arm 46 (seen in FIG. 7) and assume a parallel configuration. Drawer housing 57 is received within the spacing between table halves 11 and 12 and supports drawer 58 in a vertical arrangement. Beverage holder 22 is received within slot 28 of drawer housing 57 beneath table half 12. Similarly, beverage holder 21 is pivotally secured beneath the underside of table half 11. As can be seen by examination of FIG. 8, drawer housing 57 and drawer 58 occupy the spacing between table halves 11 and 12 in their folded positions making use of space which would otherwise be wasted.

FIG. 9 sets forth an alternate embodiment of bracket 20 for use in securing table 10 to under surface 97 of dashboard 96 (seen in FIG. 3). An alternate mounting bracket 120 defining a cylindrical portion 121 receiving arm 65 in the same manner set forth above for bracket 20 further includes an extension 122 and a generally planar mounting flange 123. Mounting flange 123 further defines a plurality of apertures 124 and 125 which accommodate fasteners for securing mounting flange 123 to under surface 97 of interior 90. It will be apparent to those skilled in the art that while brackets 20 and 120 provide attachment of the present invention adjustable folding table to vertical and horizontal surfaces respectfully, additional mounting brackets may be configured for pivotally securing arm 65 to surfaces other than vertical and horizontal surfaces without departing from the spirit and scope of the present invention.

What has been shown is a convenient easy to use adjustable folding table for vehicles which facilitates a wide range of dimensional adjustments to accommodate a variety of vehicle interior configurations and sizes. In addition, the multiple articulation of the present invention adjustable folding table permits the positioning of the table portion in a variety of locations within the vehicle interior. The adjustable folding table shown facilitates out of the way storage by simply folding the table halves downwardly to the folded position and pivotally adjusting table position to a convenient out of the way location within the vehicle interior.

While particular embodiments of the invention have been shown and described, it will be obvious to those skilled in the art that changes and modifications may be made without departing from the invention in its broader aspects. Therefore the aim in the appended claims is to cover all such changes and modifications as fall within the true spirit and scope of the invention.

That which is claimed is:

1. For use within a vehicle interior having an interior surface, an adjustable folding table comprising:
   first and second planar table halves;
   a first support member having a first arm and a second arm joined in a substantially orthogonal relationship;
   hinge means pivotally securing said first and second table halves to said first arm of said first support member, said first and second table halves pivotable between a horizontal opposed open position and a parallel vertical closed position;
   lock means locking said first and second table halves in said open position;
   a second support member having a third arm, joined to said second arm in a rotational attachment in which said second arm is rotatable with respect to said third arm and defining an extendable member having an adjustable length, and a fourth arm joined orthogonally to said third arm; and
   bracket means receiving said fourth arm in a pivotal attachment and having attachment means for securing said bracket means to an interior surface within the vehicle interior.

2. An adjustable folding table as set forth in claim 1 wherein said third arm defines a T-shaped member having a passage therethrough and wherein said second arm extends through said passage in a pivotal attachment.

3. An adjustable folding table as set forth in claim 2 wherein said second arm includes a first lock ring encircling said second arm above said passage, said second arm being supported by said first lock ring and said T-shaped member.

4. An adjustable folding table as set forth in claim 3 wherein said bracket means define a bracket passage and wherein said fourth arm is received within said bracket passage.

5. An adjustable folding table as set forth in claim 4 wherein said fourth arm defines a second lock ring encircling said fourth arm above said bracket passage, said fourth arm being supported by said second lock rings and said bracket means.

6. An adjustable folding table as set forth in claim 5 wherein said extendable member of said third arm includes an extension joined to said T-shaped member, a hollow sleeve receiving said extension in a sliding manner, and fastening means securing said extension within said sleeve.

7. An adjustable folding table as set forth in claim 1 wherein said first arm is generally cylindrical and wherein said hinge means include:
   a first pair of spaced apart rings attached to said first table half and encircling said first arm; and
   a second pair of spaced apart rings joined to said second table half and encircling said first arm between said first pair of rings in an abutting relationship in which each of said rings within said first pair of rings is juxtaposed upon said first arm with one of said rings in said second pair of rings.

8. An adjustable folding table as set forth in claim 7 wherein said first arm includes a raised edge and wherein one of said rings in said first pair of rings is positioned adjacent said raised edge and wherein said lock means include:
   a first notch defined in said raised edge, a second notch defined in the one of said first pair of rings adjacent said raised edge, said second notch facing the juxtaposed one of the rings in said second pair of rings;
   a first tab extending from said adjacent one of said first pair of rings, and a second tab extending from the juxtaposed one of the rings in said second pair of rings toward said second notch;
   a spring lock ring encircling and joined to said first arm intermediate said first and second pairs of rings; and
   a spring compressively captivated between said spring lock ring and the juxtaposed one of the rings in said second pair of rings and encircling said first arm;
   said first and second tabs being received within said first and second notches respectively when said table halves are in said open position and maintained therein by the force of said spring.

9. An adjustable folding table as set forth in claim 8 wherein said first table half defines a drawer housing having an internal drawer channel and wherein said adjustable folding table includes a drawer slideably received within said drawer channel.

10. An adjustable folding table as set forth in claim 9 wherein said first and second table halves each define surfaces which face upwardly in said open position, common abutting edges, outer edges, and a raised lip extending upwardly from said outer edges.

11. An adjustable folding table as set forth in claim 10 further including a generally circular beverage holder having an arm pivotally joined to said first table half.

12. An adjustable folding table as set forth in claim 1 wherein said first table half defines a drawer housing having an internal drawer channel and wherein said adjustable folding table includes a drawer slideably received within said drawer channel.

13. An adjustable folding table as set forth in claim 12 wherein said first and second table halves each define surfaces which face upwardly in said open position, common abutting edges, outer edges, and a raised lip extending upwardly from said outer edges.

14. An adjustable folding table as set forth in claim 13 further including a generally circular beverage holder having an arm pivotally joined to said first table half.

* * * * *